Oct. 9, 1928.  
O. H. HILDRETH  
CIRCULAR SAW  
Filed April 30, 1927
1,687,448
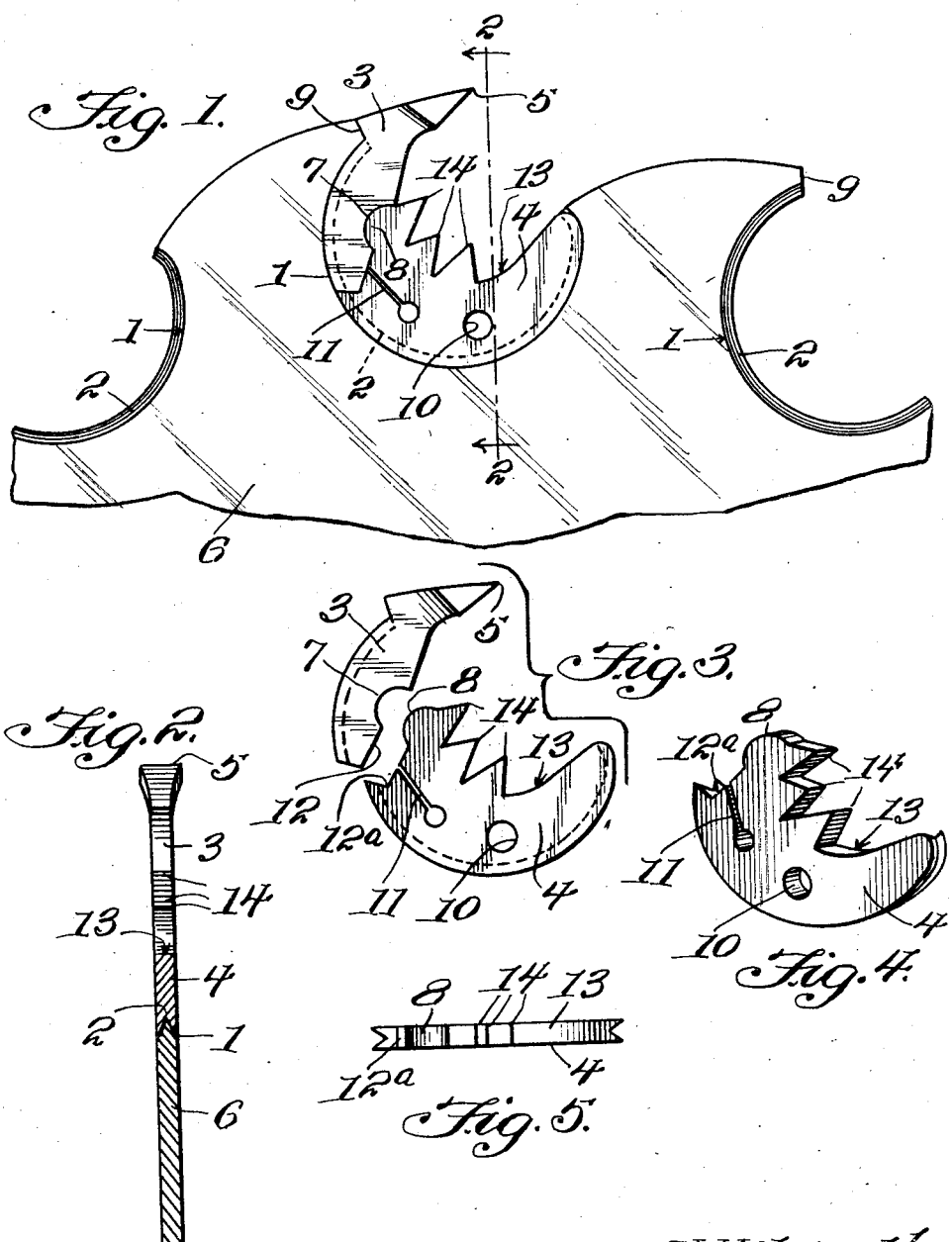
Ossion H. Hildreth
INVENTOR
Victor J. Evans
ATTORNEY
WITNESS: J. T. L. Wright Patented Oct. 9, 1928.

1,687,448

UNITED STATES PATENT OFFICE.

OSSION H. HILDRETH, OF WILTON, MAINE.

CIRCULAR SAW.

Application filed April 30, 1927. Serial No. 187,880.

This invention relates to circular saws, the object of the invention being to afford a freer discharge of the sawdust from the gullet of the teeth and prevent distortion of the saw by gorging slivers between the saw and the timber walls in the saw kerf. In some types of circular saws a compound replaceable tooth is inserted in the gains formed in the circular gullet adjacent to a cutting tooth in which is discharged the sawdust ripped from the timber by the rapid rotation of the saw. These teeth are very often of a compound character, being formed of two pieces, one with a recess and the other with a projection to miter together to form a key to lock the compound tooth in the gullet. I have discovered in a long experience as a sawyer that the sawdust, especially in sawing green timber, does not discharge from the chambered gullet but packs therein and interferes with efficient sawing of the timber. Moreover, in the case of timber having a soft tenacious bark the tangential tooth which does the cutting is frequently tenaciously resisted by the bark which yields instead of being cut thereby, resulting in a shearing action to divide the bark and form slivers as it advances to the saw, which are drawn into the saw kerf and from a tremendous frictional resistance against the walls of the kerf, not only interfering with efficient action of the saw by reducing its peripheral speed, but distorting and warping the saw by lateral pressure due to the binding action of the sliver of bark against the side or sides of the saw. The saw tooth is commonly flared so as to have a wider cutting edge than the transverse thickness of the saw, so that the clearance between the saw kerf and the blade conduces toward such choking effect. The undue accumulation of sappy sawdust in the gullet adjacent the tooth by its resistance and slowing action on the saw contributes to this objectionable functional incident. I have discovered that both the difficulty of packing and wedging in the saw kerf may be absolutely prevented by roughening the surface of the gullet, especially by forming therein one or more sharp teeth, preferably a plurality of them, following the contour of the gullet, against which the sawdust on any tendency to pack is forced to rotate by the additional material fed by the tooth during its rotation and grind against the sharp tooth or teeth, thereby being reduced to a finer grain and better adapted to be freely discharged from the open end of the gullet.

My invention, therefore, consists in an inserted tooth of a circular saw provided in its inner contour with one or more teeth. The invention comprises other more specific features, the novelty of which will be hereinafter described and will be definitely indicated in the appended claims.

In the accompanying drawings illustrating the invention:

Figure 1 is a side elevation of a part of a circular saw having an inserted tooth embodying my invention.

Figure 2 is a transverse section on the plane 2—2 of Figure 1.

Figure 3 illustrates the several component parts of my improved tooth.

Figure 4 is an isometric projection of one part of the compound tooth.

Figure 5 is a plan view of the periphery of the toothed member of Figure 3.

Referring now in detail to the drawings, 1 represents a plurality of teeth sockets or gullets for the reception of an insertible tooth in the circular saw. These are commonly provided with V-shaped grooves or gains 2 formed by a lathe in the circular recess forming the tooth gullet. Commonly, these inserted teeth are compound in character but with a specially designed gullet might be formed in one piece and my invention is equally applicable to either type. The drawing illustrates a tooth of compound character which is commonly used, being composed of two sections 3, 4, the former lying when assembled tangential to the periphery of the circular saw and having a sharp cutting edge 5 wider than the cross section of the saw blade 6, whereby the saw kerf formed by the removal of the woody fiber from the timber forms a clearance for the saw blade and permits it to act efficiently. The section 4 matches with the section 3 of the compound tooth by an interlocking joint formed in an arched or angular recess 7 and a cooperating similarly shaped tongue 8, both being of the same thickness of stock so as to match smoothly when assembled in the tooth recess or gullet. 9 represents a rectangular face on the edge wall of the saw, against which engages a corresponding shoulder of the member 3 and a hole 10 in the cooperating member 4 permits the two members to be driven into the socket snugly and locked therein against shifting. A slot 11 is commonly provided in the member 4 which will spring a little when the compound tooth is assembled and give a binding action to lock the tooth in place. In my construction I prefer to make this joint 7 and 8 between the two parts of a rectangular outline, as indicated in Figure 3 at 12, 12ª, which tends to form a tighter joint than the circular contour. Within the gullet 13 of the tooth I provide one or more sharpened teeth 14.

In my experience as a practical sawyer my first attempt in correction of the evil of choking up of the saw gullets was to simply provide a transversely ribbed surface of the gullet and I discovered that it made a decided difference in the action of the saw, but when I provided a toothed surface I found that the improvement was greatly accentuated both in affording a freer discharge of the sawdust on all kinds of timber, green or dry, and especially in preventing the slivers of bark from being drawn into the saw kerf and deforming the saw and reducing its efficiency. As the saw turns in the timber and the teeth are gradually brought deeper and deeper into the saw kerf, the amount of incised material in the form of sawdust accumulates as the tooth bites deeper into the timber and in a deep cut will pack and resist free discharge on reaching the open air and with the next accession of cutting will tend to pack and resist the cutting action of the saw. My toothed interior periphery prevents this by the roughened surface, tending to distribute the inflow of sawdust keeping it in motion so that on the exit of the tooth from the timber it will more freely discharge, and in case of any accumulation sufficient to form a packing, as in sawing green timber, a full gullet will be churned against the teeth and reduced in grain texture so as to be more freely voided.

While I have described my teeth as being preferably sharpened, as noted heretofore, I have found improved results with teeth that are not sharpened but simply formed into a roughened transverse surface to agitate the sawdust. I have found the best results follow, however, when I sharpen the teeth and use more than one of them.

Having thus described my invention, what I claim as new and desire to secure by Letters Patent is:

1. In an inserted tooth saw a replaceable tooth having a recessed curved interior wall with a transverse projection therein adapted to cut sawdust and prevent packing in the gullet.

2. In an inserted tooth saw a replaceable tooth having an inner recessed locking section carrying a plurality of sharp teeth.

3. An insertible tooth for a saw formed of a pair of steel parts with peripheral grooves connected at a tongue and groove joint, the outer member adapted to form a cutting tooth tangential to the saw periphery, the other having an internal recess carrying a plurality of sharp teeth lying in a plane transverse to the axis of saw rotation.

In testimony whereof I affix my signature.

OSSION H. HILDRETH.